US009443630B2

(12) United States Patent
Folman et al.

(10) Patent No.: US 9,443,630 B2
(45) Date of Patent: Sep. 13, 2016

(54) COHERENT FIELD GRADIENT MOMENTUM SPLITTING

(71) Applicant: BEN GURION UNIVERSITY OF THE NEGEV RESEARCH AND DEVELOPMENT AUTHORITY, Beer Sheva (IL)

(72) Inventors: Ron Folman, Rehovot (IL); Yonathan Japha, Rehovot (IL); Shimon Machluf, Ashkelon (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 0 days.

(21) Appl. No.: 14/420,397

(22) PCT Filed: Aug. 8, 2013

(86) PCT No.: PCT/IB2013/056496
§ 371 (c)(1),
(2) Date: Feb. 9, 2015

(87) PCT Pub. No.: WO2014/024163
PCT Pub. Date: Feb. 13, 2014

(65) Prior Publication Data
US 2015/0200028 A1 Jul. 16, 2015

Related U.S. Application Data

(60) Provisional application No. 61/681,166, filed on Aug. 9, 2012.

(51) Int. Cl.
*G01C 19/60* (2006.01)
*G21K 1/00* (2006.01)
(Continued)

(52) U.S. Cl.
CPC ............. *G21K 1/006* (2013.01); *G01B 9/02* (2013.01); *G01C 19/60* (2013.01); *G01P 15/00* (2013.01)

(58) Field of Classification Search
CPC .......................................... G21K 1/006
USPC ........................................... 250/251
See application file for complete search history.

(56) References Cited

U.S. PATENT DOCUMENTS

| 2005/0027489 A1* | 2/2005 | Kasevich | ............... G01V 7/06 |
| | | | 702/189 |
| 2011/0234219 A1* | 9/2011 | Boehi | .................. G01R 33/10 |
| | | | 324/260 |

FOREIGN PATENT DOCUMENTS

FR    2968088    6/2012

OTHER PUBLICATIONS

Böhi; et.al, "Coherent manipulation of Bose-Einstein condensates with state-dependent microwave potentials on an atom chip", Nature Physics 5, 592-597 2009.*

(Continued)

*Primary Examiner* — Phillip A Johnston
(74) *Attorney, Agent, or Firm* — Roach Brown McCarthy & Gruber, P.C.; Kevin D. McCarthy

(57) ABSTRACT

Systems and methods for coherent splitting of a matter wave for supporting a variety of applications and fundamental studies in the fields of matter wave momentum splitting and interferometry. The systems and methods utilize pulsed field gradients and Rabi transitions between internal energy states. A matter wave is transformed into a superposition of spatially separated propagating wavepackets and spatial interference fringes with measurable phase repeatability were measured as a proof for the coherence of the splitting. A continuously tunable wide range of momentum difference between wavepackets may be received by controlling only the duration and strength of the pulsed gradients. Achieving high phase stability and various splitting schemes using different geometries, fields and energy levels, as well as various interferometric applications are disclosed.

20 Claims, 10 Drawing Sheets

(51) Int. Cl.
    *G01B 9/02*    (2006.01)
    *G01P 15/00*   (2006.01)

(56) References Cited

OTHER PUBLICATIONS

Kasevich; et.al, "Atomic Interferometry Using Stimulated Raman Transitions", Physical Review Letters, vol. 67, Jul. 2, 1991.*

Böhi, "Coherent manipulation of ultracold atoms with microwave near-fields", Dissertation, Ludwig-Maximilians-Universität München, Jul. 2010, pp. 1-186.*

Pascal Boehi et al. "Coherent manipulation of Bose-Einstein condensates with state-dependent microwave potentials on an atom chip". Nature Physics 5, 592-597 (2009).

International Search Report from a counterpart foreign application, three pages, mailed Feb. 10, 2014.

* cited by examiner

COHERENT FIELD GRADIENT MOMENTUM SPLITTING

FIELD OF THE INVENTION

The invention relates to systems and methods for coherent momentum splitting of a matter wave.

BACKGROUND

The development of atom interferometry over the last two decades has given rise to new insights into the tenets of quantum mechanics as well as to ultra-high accuracy sensors for fundamental physics and technological applications. Examples range from the creation of momentum state superpositions by accurate momentum transfer of laser photons allowing high precision measurements of rotation, acceleration and gravity, to the splitting of trapped ultracold atoms by local potential barriers allowing the investigation of fundamental properties of quantum systems of a few or many particles, such as decoherence and entanglement.

One of the tools for atom interferometry is the atom chip. The high level of spatial and temporal control of local fields which is facilitated by the atom chip has made it an ideal tool for the splitting of a Bose-Einstein condensate (BEC) into a double well potential by a combination of static magnetic fields with radio frequency (RF) or microwave fields. Pure static fields or light fields have also been used. However, practical atom chip schemes for interferometry with a wide dynamic range and versatile geometries are still very much sought-after. Such schemes may enable, for example, sensitive probing of classical or quantum properties of solid state nano-scale devices and surface physics. This is expected to enhance considerably the power of non-interferometric measurements with ultracold atoms on a chip, which have already contributed, for example, to the study of long-range order of current fluctuations in thin films, the Casimir-Polder force and Johnson noise from a surface. In addition, interferometry integrated on a chip is a crucial step towards the development of miniature rotation, acceleration and gravitational sensors based on guided matter-waves.

The disclosed technique follows one of the earliest attempts to envision atom interferometry. The idea of using the Stern-Gerlach (SG) effect, which has become a paradigm of quantum mechanics, as a basis for interferometry was considered shortly after its discovery, almost a century ago. It was generally judged to be impractical due to the extreme accuracy which would be required. The systems and methods of the present invention demonstrate spatial interference fringes with a measurable phase stability, originating from spatially separated paths in SG interferometry.

SUMMARY

The following embodiments and aspects thereof are described and illustrated in conjunction with systems, tools and methods which are meant to be exemplary and illustrative, not limiting in scope.

There is provided, in accordance with an embodiment, a method for coherent momentum splitting of a matter wave of at least one particle, the method comprising the steps of: applying on said matter wave a first $\pi/2$ Rabi rotation pulse, wherein said matter wave is split into a superposition of internal states; applying on said matter wave a field gradient during a predefined time interval, wherein said field gradient constitutes a state selective force; and applying on said matter wave a second $\pi/2$ Rabi rotation pulse, wherein said matter wave is split into a superposition of internal and momentum states.

According to some embodiments, a method for matter wave interferometry is provides, said method comprising the steps of: first coherent momentum splitting of said matter wave in accordance with the method for coherent momentum splitting, wherein said matter wave is split into a first superposition of internal and momentum states; and second coherent momentum splitting of at least one internal state of said first superposition in accordance with the method the method for coherent momentum splitting, wherein said at least one internal state is split into a second superposition of internal and momentum states, whereby a portion of momentum states of said second superposition, having the same internal state, are at rest in the center of mass frame of said same internal state, and whereby said portion of momentum states expand and overlap to create a spatial interference.

According to some embodiments, a method for matter wave interferometry is provided, said method comprising the steps of: a first coherent momentum splitting in accordance with the method for coherent momentum splitting, wherein said matter wave is split into a first superposition of internal and momentum states; applying a returning force on said split matter wave for reversing the momentum of at least one of said internal states in a center of mass frame of said at least one internal state; and a second coherent momentum splitting in accordance with the method for coherent momentum splitting, when said reversed internal state overlap in space, wherein said reversed internal state is split into a second superposition of internal and momentum states, whereby a portion of the states of said second superposition is at rest in the center of mass frame of said reversed internal state, and whereby said portion of states interferes internally.

There is further provided, in accordance with an embodiment, a method for coherent momentum splitting of first order magnetically insensitive states of a matter wave of at least one particle, the method comprising the steps of: applying on said matter wave a first $\pi/2$ Rabi rotation pulse, wherein said matter wave is split into a superposition of magnetically insensitive internal states; and applying on said matter wave a field gradient during a predefined time interval, wherein said field gradient constitutes a state selective force, and wherein said matter waves is split into a superposition of internal and momentum states.

There is further provided, in accordance with an embodiment, a system for coherent momentum splitting of a matter wave of at least one particle, the system comprising: a pulse generator configured to generate a first and a second $\pi/2$ Rabi rotation pulse, whereby said first and second pulse split said matter wave into a superposition of internal states; and a field gradient generator configured to apply a state selective force on said internal states during a predefined time interval, whereby said matter wave is split into a superposition of internal and momentum states.

According to some embodiments, an interferometer is provided comprising at least one system according to the system for coherent momentum splitting, said system configured to split said matter wave into a first superposition of internal and momentum states and split at least one internal state of said first superposition into a second superposition of internal and momentum states, whereby a portion of the momentum states of said second superposition, having the same internal state, are at rest in the center of mass frame of said same internal state, and whereby said portion of momentum states expand and overlap to create a spatial interference.

According to some embodiments, an interferometer is provided comprising: at least one system according to the system for coherent momentum splitting, configured to split said matter wave into a first superposition of internal and momentum states and split a reversed internal state of said first superposition, when said reversed internal state overlap in space, into a second superposition of internal and momentum states; and a returning force generator, configured to generate said reversed internal state by reversing the momentum of at least one of the internal states of said first superposition in a center of mass frame of said at least one internal state, whereby a portion of the states of said second superposition is at rest in the center of mass frame of said reversed internal state, and whereby said portion of states interferes internally.

There is yet further provided a system for coherent momentum splitting of first-order magnetically insensitive states of a matter wave of at least one particle, the system comprising: a pulse generator configured to generate a $\pi/2$ Rabi rotation pulse, whereby said pulse split said matter wave into a superposition of magnetically insensitive internal states; and a field gradient generator configured to apply a state selective force on said magnetically insensitive internal states during a predefined time interval, wherein said matter wave is split into a superposition of momentum states.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Glossary

Figure 1A:
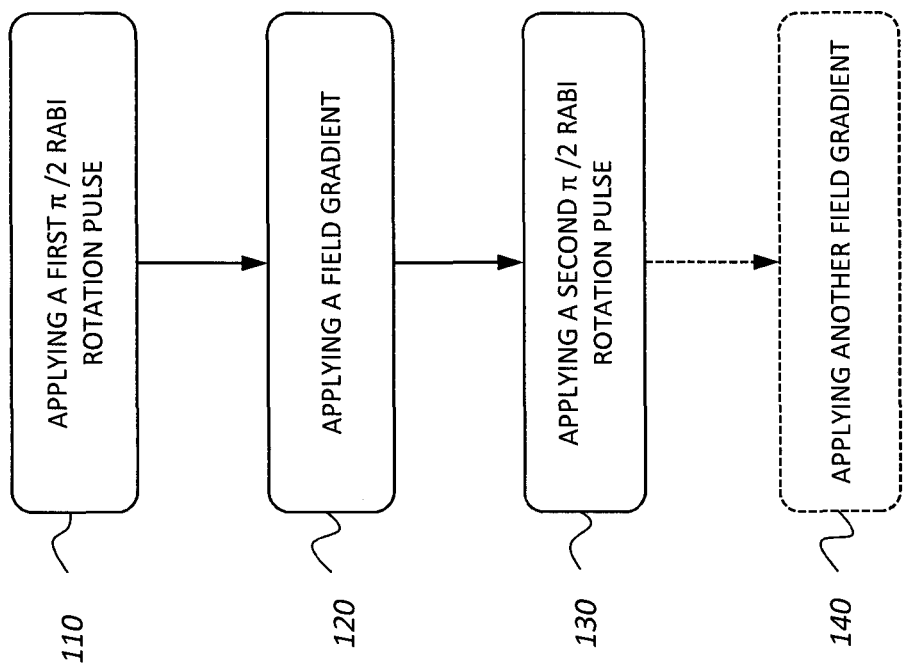
FIG. 1A is a diagram of an exemplary method for field gradient splitting operative in accordance with an embodiment of the disclosed technique.

The term "matter wave", as referred to herein, may relate to one or more particles, e.g., a cloud of particles.

The terms "particle" or "particles" as referred to herein, may relate to different kinds of particles, such as atoms, molecules and electrons.

The terms "energy state" or "internal state" or "internal energy state" or just "state" with respect to a matter wave or particles, as referred to herein, are alternative terms and all relate to the internal energy state of the matter wave or particles.

The terms "external state" or "momentum state" or "external momentum state" with respect to a matter wave or particles, as referred to herein, are alternative terms and all relate to the external momentum state (i.e., linear momentum) of the matter wave or particles.

The terms "cold atoms", as referred to herein, may relate to atoms in a temperature which is below 1 milliKelvin.

The terms "ultracold atoms", as referred to herein, may relate to atoms which have been laser cooled below the Doppler limit.

The foregoing examples of the related art and limitations related therewith are intended to be illustrative and not exclusive. Other limitations of the related art will become apparent to those of skill in the art upon a reading of the specification and a study of the figures.

The systems and methods of the disclosed technique demonstrate a coherent field gradient momentum splitting. The disclosed technique utilizes the SG effect, but it is very different from previous theoretical and experimental schemes of SG interferometry. For example, the disclosed technique uses wavepackets on the micrometer scale. In addition, the time scales in which particles propagate while in a superposition of two different energy states are extremely short as the output of the disclosed technique includes different momentum states of the same energy state, which is a crucial advantage in noisy environments. This is why, in contrast to previous techniques, the disclosed technique does not require shielding. Another feature of the disclosed technique is a decoupling between the wavepacket position and its phase. This phase invariance to the initial position reduces the requirement for accuracy at the preparation stage.

The disclosed technique may further utilize an atom chip, which allows not only for miniaturization, but also the accurate manipulation of the quantum state. More so, if minimal uncertainty wavepackets are utilized, the phase dispersion due to the evolution through the in-homogeneous potential is considerably smaller.

The disclosed technique may provide tunable high dynamic range of momentum transfer and its natural integrability with an atom chip. Compared with previous atom chip experiments with double well potentials, which are limited to relatively slow splitting to prevent higher mode excitations, the disclosed technique allows, inter alia, a wide range of splitting times which enable the investigation of many-body effects of entanglement and squeezing over new parameter regimes. For example, in the presence of atom-atom interactions generation of a coherent many-body state is possible only by fast splitting. On the other hand, the disclosed technique, in case magnetic field gradients are used for splitting, is more naturally and easily suited for integration with an atom chip compared to laser light splitting methods. Thus, interferometry based on the disclosed technique may be suitable for high sensitivity measurements on the micron scale.

As presented below, the disclosed technique may allow for momentum splitting of over 100 photon recoils ($100\,\hbar k$) in just a few μs (for reference photons of $2\pi/k=1$ μm wavelength). This may enable advantageous large angle interferometers making highly sensitive probes. The disclosed technique may also enable sensitive probing of classical or quantum properties of solid state nanoscale devices and surface physics. The latter is expected to enhance considerably the power of non-interferometric measurements with ultracold atoms on a chip, which have already contributed, for example, to the study of long-range order of current fluctuations in thin films, the Casimir-Polder force and Johnson noise from a surface. In addition, the disclosed technique is a crucial step towards the development of miniature rotation, acceleration and gravitational sensors based on guided matter-waves. Furthermore, an a combination of high momentum splitting according to the disclosed technique with the advantages of chip-scale integration, may serve for exploring new regimes of fundamental quantum mechanics and basic effects, such as coherence and entanglement, in many-body systems. In view of the versatility of the disclosed technique, one expects that it will enable a wide range of fundamental as well as technological applications.

Figure 1B:
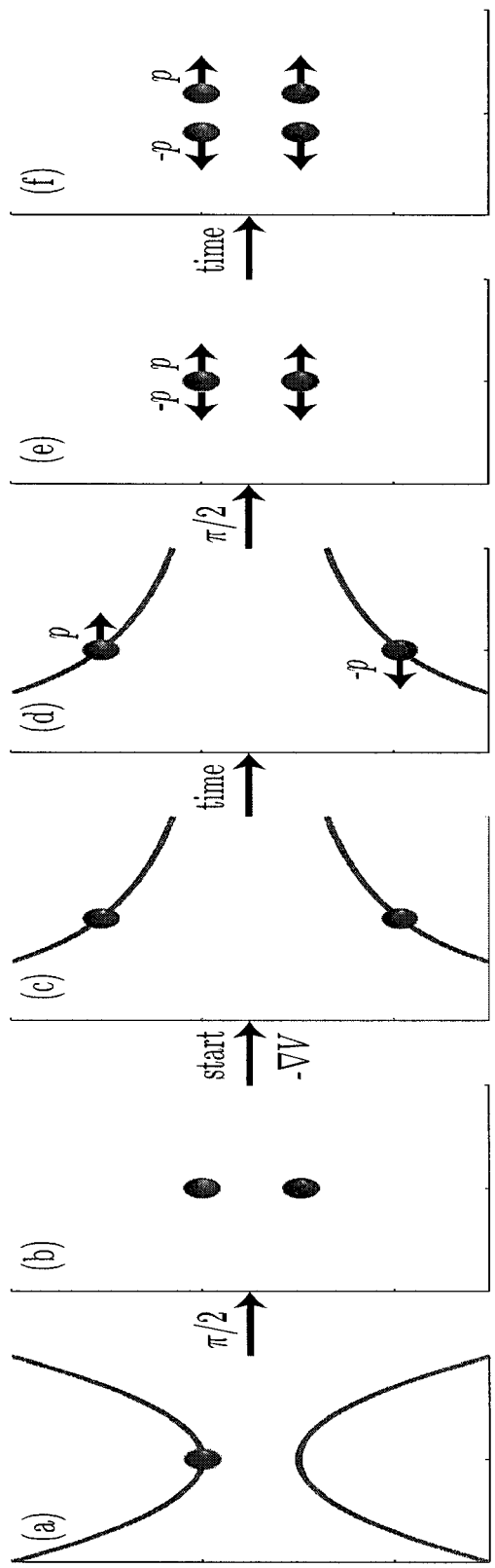
FIG. 1B is a diagram which illustrates how the method of FIG. 1A operates on a single particle.

Reference is now made to FIGS. 1A and 1B. FIG. 1A is a diagram of an exemplary method for field gradient splitting operative in accordance with an embodiment of the disclosed technique. FIG. 1B is a sequence of illustrations which show how the method of FIG. 1A operates on a single exemplary particle, i.e., an atom.

The method is based on a combined manipulation of two internal states ($|1\rangle$ and $|2\rangle$) and an external potential. The method generally includes performing a Ramsey-like sequence of two π/2 Rabi rotations and applying a field gradient during the time interval between them. The states $|1\rangle$ and $|2\rangle$ may be any two states enabling controlled coherent transitions between them, and having a state dependent interaction with the field gradient.

Exemplary particles in internal state $|2\rangle$ and an external state $|p_0, x_0\rangle$, representing wavepacket with central momentum $p_0$ and central position $x_0$, are considered. With reference to FIG. 1B, the vertical axis of the illustrations shown in the Figure represents energy while the horizontal axis represents a spatial dimension. Illustration (a) shows a particle in a state $|2\rangle$ released from a trap. In step 110, a first π/2 Rabi rotation pulse is applied on the particles. The π/2 Rabi rotation pulse transfers the particles into the superposition state $$\frac{1}{\sqrt{2}}(|1\rangle + |2\rangle).$$

With reference to FIG. 1B, illustration (b) shows the particle in a superposition of two internal energy levels $|1\rangle$ and $|2\rangle$. In step 120, a field gradient which constitutes a state-selective force $F_j = -\nabla V_j$ (j=1, 2) is applied for a predefined time interval, indicated as interaction time T. With reference to FIG. 1B, illustration (c) shows how the force constituted by the field gradient provides a different momentum to each state. Reference is made back to FIG. 1A, the state of the particles after time T is then $$\frac{1}{\sqrt{2}}(|1\rangle e^{iF_1 \cdot xT/\hbar} + |2\rangle e^{iF_2 \cdot xT/\hbar})|p_0, x_0\rangle$$

where each level acquires a phase gradient $\nabla[-V_j(x)T/\hbar]=F_jT/\hbar$, which is equivalent to a momentum transfer $p_0 \to p_0 + F_j T$. With reference to FIG. 1B, illustration (d) shows how after a time period in which the field gradient is applied, the atoms in the two internal states are accelerated into different momentum. In step 130, a second π/2 Rabi rotation pulse is applied. The second pulse transfers the particles into the superposition state $$\frac{1}{\sqrt{2}}(|I_-\rangle\sqrt{b^2-4ac}\,|p_1, x_0\rangle + |I_+\rangle|p_2, x_0\rangle) = \frac{1}{\sqrt{2}}(|1\rangle|p_+\rangle - |2\rangle|p_-\rangle) \quad (1)$$

representing two wavepackets with momentum $p_j = p_0 + F_j T$ entangled with the internal states $$|I_\pm\rangle \equiv \frac{1}{\sqrt{2}}(|1\rangle \pm |2\rangle),$$

such that each of the internal states $|1\rangle$ and $0|2\rangle$ is in a superposition $$|p_\pm\rangle \equiv \frac{1}{\sqrt{2}}(|p_1, x_0\rangle \pm |p_2, x_0\rangle)$$

of wavepackets with different momentum. With reference to FIG. 1B, illustration (e) shows how the second π/2 Rabi rotation pulse produces a superposition of four parts with two different momentum and two different internal states. Illustration (f) shows how after some evolution time the momentum components are split spatial.

In the derivation and in FIG. 1B the interaction time T is assumed to be short such that the motion of the wavepackets is smaller than their size (for simplicity). Eq. (1) is also valid if the particles motion during the interaction time is taken into account or when the force is not homogeneous in space and time. In such a case, the states $|p_j, x_0\rangle$ should be replaced with the more general solutions for the wavepacket evolution in the respective potentials $V_j(x, t)$. The $|1\rangle$ and $|2\rangle$ states may be used to realize two parallel interferometers for noise rejection. Furthermore, the entangled momentum and internal state may be used as an interferometer of two clocks. If only one of the two internal states is desired, a dedicated transition, as known in the art, may be used, in order to discard the redundant state.

In optional step 140, in order to spatially distinguish between all four output wavepackets predicted by Eq. (1), another field gradient is applied, to generate a separation between the two internal states (as realized in the experiment detailed below).

Figure 2:
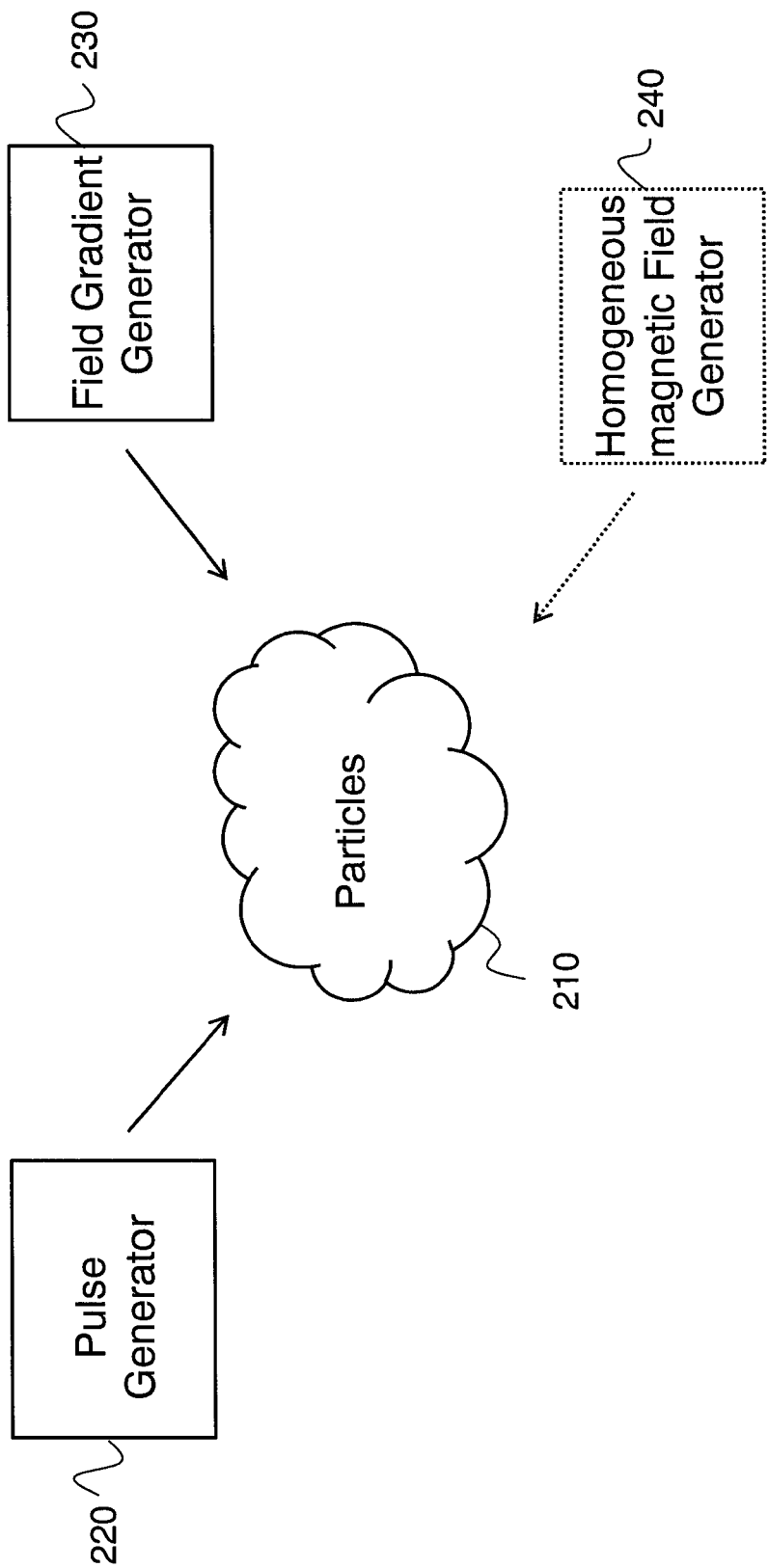
FIG. 2 is a schematic block diagram of a layout of a field gradient beam splitter (FGBS) system, constructed and operative in accordance with an embodiment of the disclosed technique.

FIG. 2 is a schematic block diagram of a layout of a field gradient beam splitter (FGBS) system, constructed and operative in accordance with an embodiment of the disclosed technique. The FGBS system (or just FGBS) is configured to split particles 210 into a superposition of momentum states. The FGBS includes a pulse generator 220 and a field gradient generator 230.

Pulse generator 220 is configured to generate a $\pi/2$ Rabi rotation pulse in accordance with the disclosed technique. Pulse generator 220 may be, for example, a radio frequency (RF) wave generator, a microwave generator or a laser source. Such generators may utilize an RF antenna, a MW antenna and customary laser optics such as mirrors, lenses, modulators, etc.

Pulse generator 220 is selected and configured such that to generate the split of particles 210 into a superposition of internal states and accordingly, the pulse frequency is tuned to the transition frequency.

Field gradient generator 230 may include different types of sources for generating different types of fields and such as magnetic field, an electric field or an optical field. The field gradient is configured to apply a state selected force on particles 210 such that each internal state of particles 210 receives a different momentum. Field gradient generator 230 may include, for example, a current carrying wire or static magnets in order to generate a magnetic field. Field gradient generator 230 may include, for example, electrodes in order to generate an electric field. Field gradient generator 230 may include, for example, laser source in order to generate an optical field. In some embodiments of the disclosed technique, the field gradient generator may be integrated with the pulse generator.

If a magnetic field gradient is desired, The FGBS may further includes a homogenous magnetic field generator 240 in order to preserve the quantum axis. Homogenous magnetic field generator 240 may include at least one electromagnetic coil, such as a solenoid. In some embodiments of the disclosed technique, the homogenous magnetic field generator may be integrated with the field gradient generator or with the pulse generator.

An FGBS according to the disclosed technique may include an atom chip. Such an atom chip may embed, for example an antenna of an RF pulse generator or a current carrying wire of a magnetic field generator.

An FGBS according to the disclosed technique further includes various electronic components designated to allow the operation of the FGBS as described above and as known in the art.

An FGBS according to the disclosed technique may be embedded in an interferometer to provide a coherent momentum splitting.

Although the experiments described herein below utilize magnetic field gradient, other field gradients may be used, such as an electric or optical.

Systems and method according to the disclosed technique may be applied on particles in different physical states, such as cold or ultracold particles, particles in BEC, thermal particles or a bean of particles. A $\pi/2$ Rabi rotation pulse that may be used in accordance with the disclosed technique may be generated by utilizing, for example, radio frequency waves, microwaves or lasers.

A field gradient according to the disclosed technique applied on a cloud of particles, may be applied at any direction with respect to the direction of the movement of the particles, i.e., parallel, perpendicular or at some other angle with respect to the movement of the particles.

Coherent momentum splitting generated by methods and systems in accordance with the disclosed technique may be used in the creation and analysis of interferometry, dephasing, entanglement and squeezing of matter waves.

Experimental Results

Figure 3A:
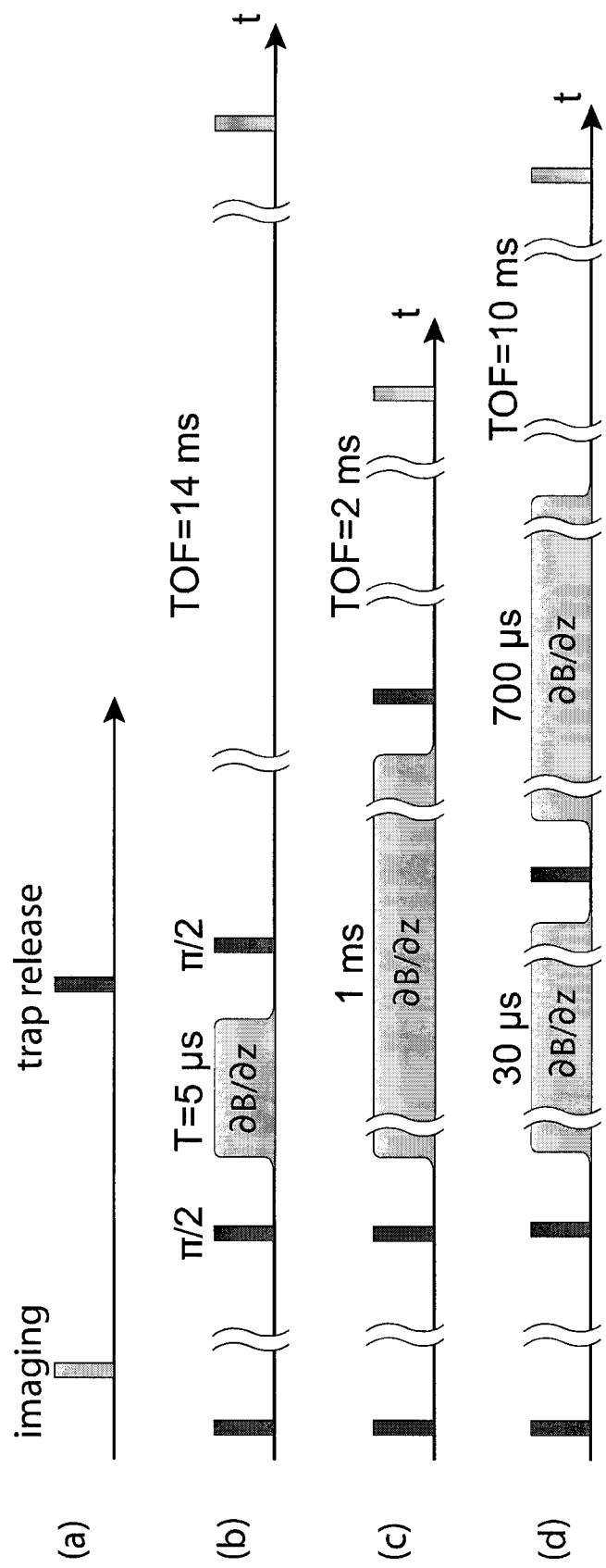
FIG. 3A is a sequence of illustration which present different schemes realized in an experiment performed in accordance with embodiments of the disclosed technique.
Figure 3B:
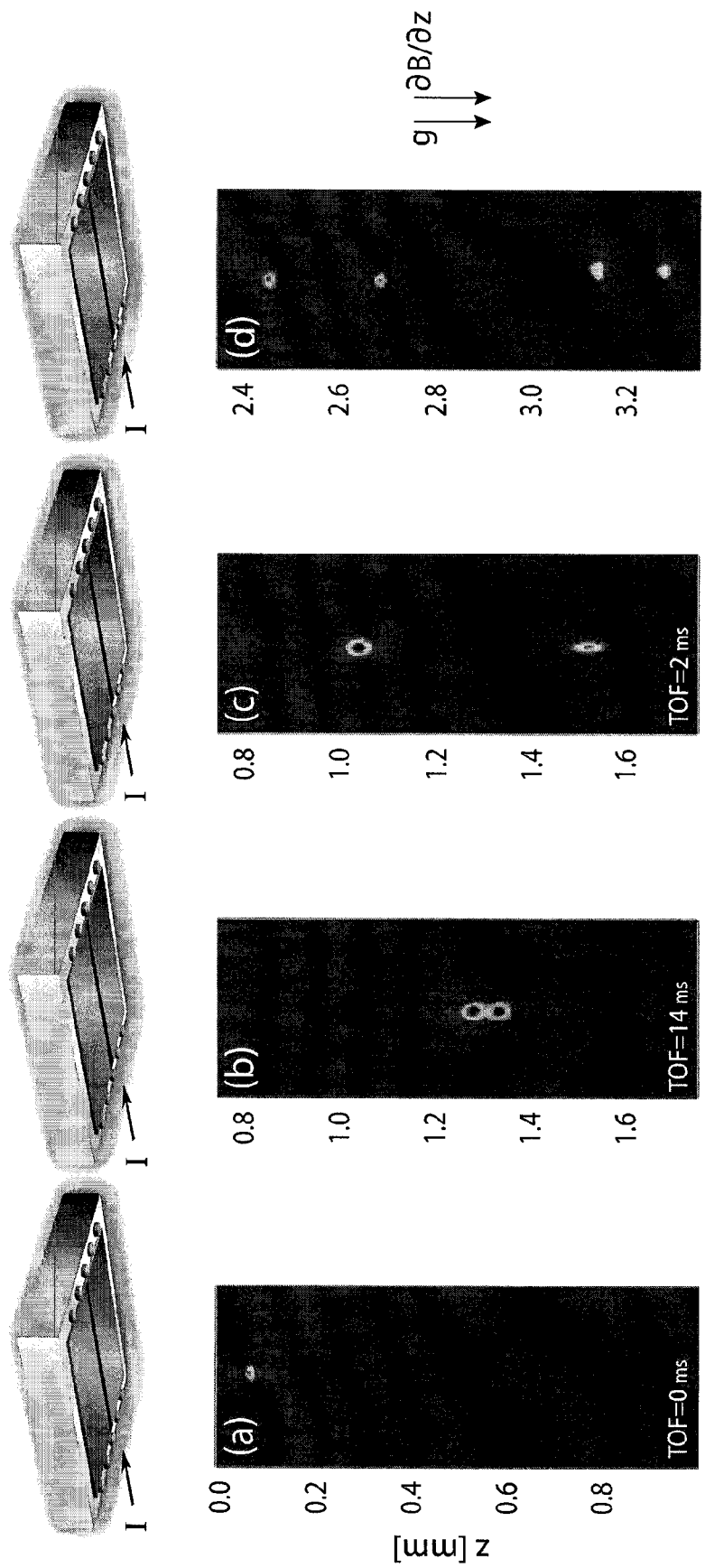
FIG. 3B is a sequence of images which show the received output of the different schemes of FIG. 3A correspondingly.

Reference is now made to FIGS. 3A and 3B. FIG. 3A is a sequence of illustration which present different schemes realized in an experiment performed in accordance with embodiments of the disclosed technique. FIG. 3B is a sequence of images which show the received output of the different schemes of FIG. 3A correspondingly. The horizontal axis of the illustrations of FIG. 3A presents time (indicated t). The axes of the images of FIG. 3B represent spatial dimensions in millimeter.

An experiment designed to realize a field gradient beam splitter (FGBS) according to the disclosed technique was performed. In this experiment Zeeman sub-levels of freely falling $^{87}$Rb atoms and magnetic field gradients from a chip wire were utilized. A BEC cloud of $\sim 10^4$ atoms in state $|F,m_F\rangle \equiv |2,2\rangle \equiv |2\rangle$ was subjected to an RF field in order to perform transitions to state $|2,1\rangle \equiv |1\rangle$. An RF generator (Agilent, USA) model 33250A, an atom chip and a current generator made by the Ben-Gurion University Atom Chip group and a copper wire antenna are used. The trap position is z=100 μm from the chip surface, and the radial (axial) trapping frequency of $|2\rangle$ is $\approx 2\pi \times 100$ Hz. In order to have the $|1\rangle$ and $|2\rangle$ states form a pure two-level system, a strong homogeneous magnetic field ($\Delta E_{12} \approx h \times 25$ MHz) is applied and the transition to $|2,0\rangle$ is pushed out of resonance by ~250 kHz due to the nonlinear Zeeman effect. Next, the BEC is released and two $\pi/2$ RF pulses with a Rabi frequency of $\Omega_R$=20-25 kHz are applied, with a magnetic gradient pulse of length T in between, thus forming a Ramsey-like sequence. The gradient is generated by a current of 2-3 A in a 200×2 μm$^2$ gold wire on the chip surface. The homogeneous magnetic field (in the direction of the magnetic field generated by the chip wire) is kept on during the free fall to preserve the quantization axis.

With reference to FIG. 3A, illustration (a) shows that imaging was performed before the atoms were released from a trap. Image (a) shows the cloud of atoms in the trap, before it is released.

A realization of a FGBS in accordance of the disclosed technique is presented in schemes (b) and (c) of FIG. 3A. A weak splitting of less than $\hbar k$ was applied using 5 μs interaction time and allowing for 14 ms time-of-flight (TOF) (shown in illustration (b) of FIG. 3A). A strong splitting of more than 40 $\hbar k$ (i.e., in order to receive momentum difference of about 200 mm per second) was applied using 1 ms interaction time and allowing for 2 ms TOF (shown in illustration (c) of FIG. 3A). With reference to FIG. 3B, images (b) and (c) present the output of the two above schemes (as shown in FIG. 3A, illustration (b) and (c) correspondingly) which exhibit the large dynamic range of the present technique, made available without any complicated sequence. In order to compare the above results with atom interferometry which include light beam splitters, the momentum transfer in expressed in units of $\hbar k$, where $\hbar k$ is a reference momentum of a photon with 1 μm wavelength. The only parameter which is changed is the interaction time T. In order to verify the internal state of the atoms [Eq. (1)] a separation between the |1⟩ and |2⟩ states is performed by applying another pulse of magnetic field gradient, a long pulse of 700 μs interaction time as shown in scheme (d) of FIG. 3A. Image (d) of FIG. 3B shows the result of the additional gradient, where four spatially separate clouds of atoms' wavepackets are observed.

Figure 4:
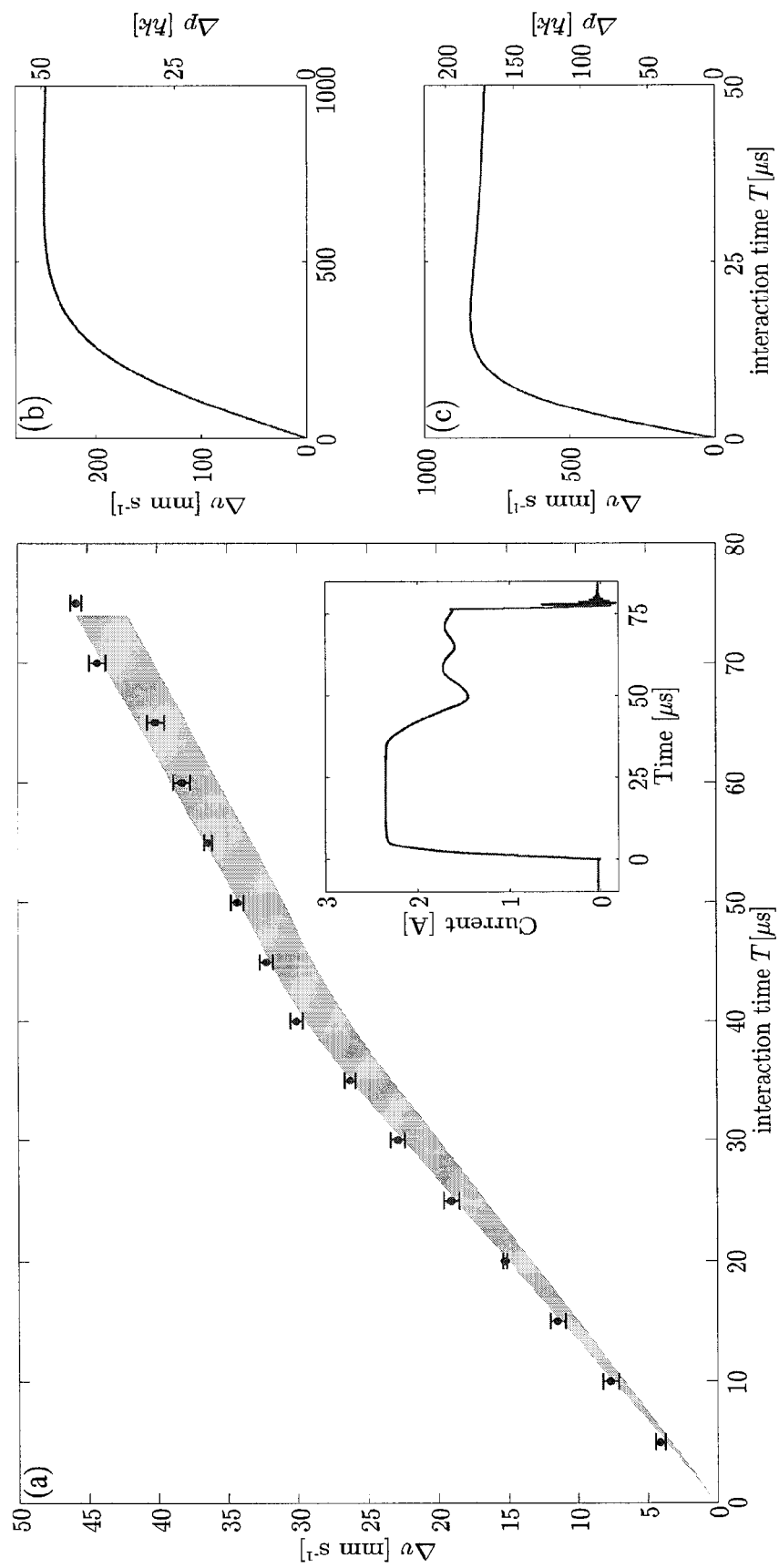
FIG. 4 shows the differential momentum between two observed clouds as a function of the interaction time T as measured in an experiment in accordance with scheme (b) of FIG. 3A.

Graph (a) of FIG. 4 shows the differential momentum between two observed clouds as a function of the interaction time T as measured in an experiment in accordance with scheme (b) of FIG. 3A. The error bars are calculated from the variation of a few data sets. The theoretical prediction (indicated as shaded area) is based on a measured current in resistor that mimics the chip wire (shown in graph (a)), taking into account errors of ±2.5 μm (one pixel) in the cloud position, ±0.2Ω in the wire resistance and a 1 μs delay of the measured rise-time (due to the resistor's inductance). An interaction time as short as 100 μs is required to transfer a relative velocity of 50 mm/s (equivalent to 10 $\hbar$k). The operation of the FGBS may be quantitatively understood by simple kinematics in one dimension (along the z axis). During the interaction time T, a differential acceleration between the wavepackets is induced, such that after the FGBS, each internal state is a superposition of two wavepackets which were accelerated as a |1⟩ or |2⟩ state. The momentum kick for a wavepacket of a certain $m_F$ state at a distance z below the chip wire is $$\frac{dp_{m_F}}{dt} = \frac{m_F g_F \mu_B \mu_0 I}{2\pi z^2} \quad (2)$$

Where $\mu_0$ and $\mu_B$ are the magnetic permeability of free space and the Bohr magneton, $g_F$ is the Land'e factor for the hyperfine state F, and I is the current. The equation does not present the nonlinear term in B and a geometric term $1/[1+(W/2z)^2]$, accounting for the finite width W of the wire. These terms have been taken into account in the simulation of the FGBS which, as presented in the figure, is in good agreement with the experimental results. The linear relation in FIG. 4 is to be expected for the short interaction times during which the atoms move only slightly and the acceleration in Eq. (2) is fairly constant. The kink in FIG. 4 is due to changing currents, i.e. the current "overshoot" at short times is responsible for the larger acceleration for small T. Graph (b) of FIG. 4, is a result of a numerical integration of Eq. (2) over T, using the experimental wire configuration, and using a constant current of 3 A. The calculated limit of the specific realization of the FGBS due to the growing distance of the atoms from the gradient source, i.e., the chip wire, is shown. In graph (c) of FIG. 4, it is shown that, for realizable chip wire parameters, momentum transfers of over 100 $\hbar$k are feasible in less than 10 μs. The parameters are: z=10 μm, I=2 A and the wire dimensions are 10×2 μm² (10⁷ A/cm² is safely achievable for such short pulses).

Observation of Interference

In order to examine the coherence of the FGBS output, a simple procedure to stop the relative motion of the two output wavepackets of internal state |2⟩ have been applied. Following that, the wavepackets were allowed to freely expand and overlap to create spatial interference fringes, as shown in graph (a) of FIG. 5 (the |1⟩ state is out of the field of view). In order to perform the above, a second gradient pulse have been applied, giving a stronger kick to the wavepacket which has the smaller momentum, and which is closer, at the relevant time, to the chip wire with respect to the wavepacket which has the larger momentum. The duration of the second momentum kick is tuned such that after the second kick the two wavepackets have the same momentum (with spatial separation denoted by 2d).

In order to understand the formation of the interference pattern a Gaussian model has been used. In this model the two interfering state |2⟩ wavepackets $|p_1, z_1⟩$ and $|p_2, z_2⟩$ have a Gaussian shape of initial width $\sigma_0$ and center trajectories $z_1(t)$ and $z_2(t)$, corresponding to atoms that have been in the internal states |1⟩ and |2⟩, respectively, during a gradient pulse of an FGBS constructed in accordance with the disclosed technique. Other alternative mathematical models, as known in the art, may be used.

Given that the final momentum difference between the two interfering wavepackets is smaller than the momentum spread of each one of them, an interference pattern appears after a long enough time, having the approximate form $$n(z,t) = A\exp\left[-\frac{(z-z_{CM})^2}{2\sigma_z(t)^2}\right]\left[1 + v\cos\left(\frac{2\pi}{\lambda}z + \phi\right)\right] \quad (3)$$

where A is a constant, $z_{CM}=(z_1+z_2)/2$ is the center-of-mass (CM) position of the combined wavepacket at the time of imaging, $\sigma_z(t) \approx \hbar t/m\sigma_0$ is the final Gaussian width, $\lambda=ht/2md$ is the fringe periodicity (2d=|$z_1-z_2$|), v is the visibility and $\phi=\phi_2-\phi_1$ is the global phase difference. The phases $\phi_1$ and $\phi_2$ are determined by an integral over the trajectories of the two wavepacket centers. It should be emphasized that Eq. (3) is not a phenomenological equation, but rather an outcome of the analytical model (further details with respect to the Gaussian model ate provided herein below under "Methods").

Figure 5:
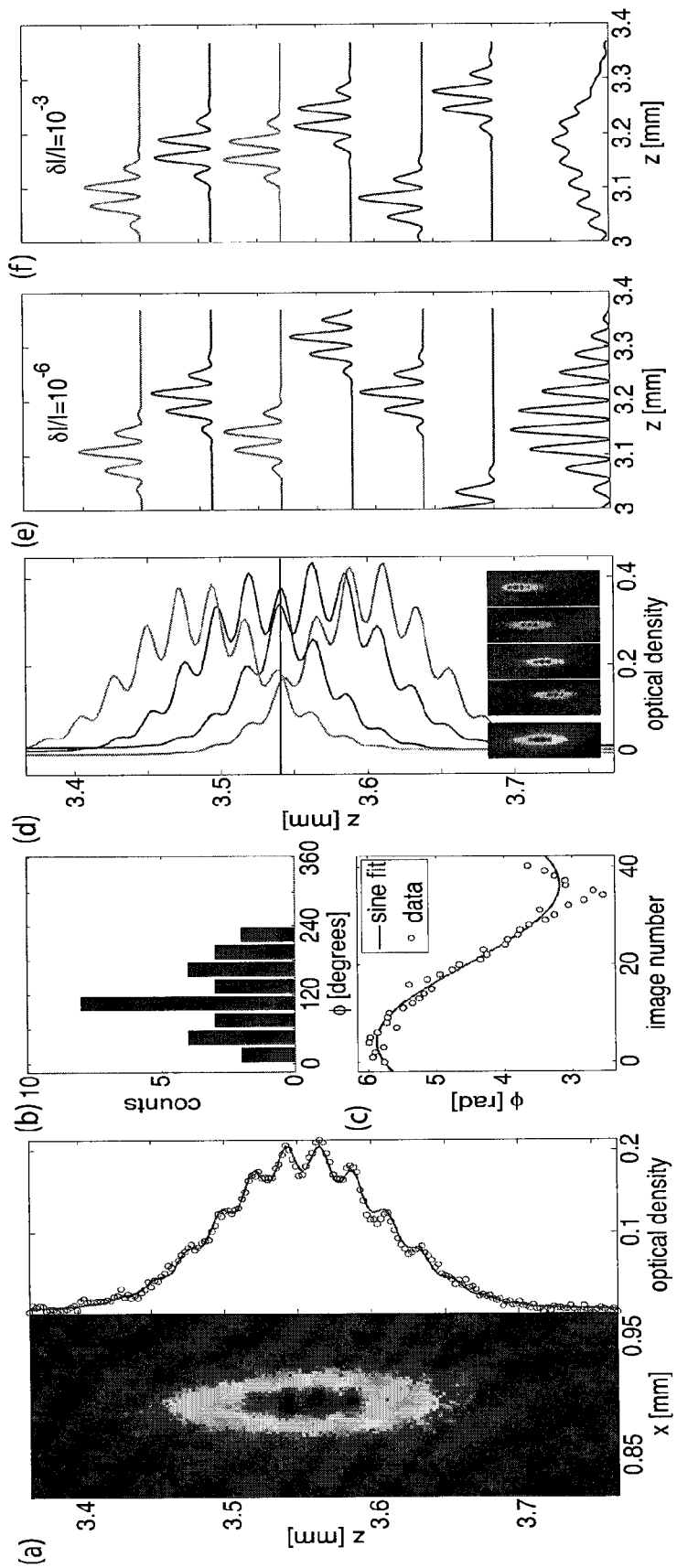
FIG. 5 shows images, graphs and simulations relating to phase stability analysis of the output of an FGBS system constructed in accordance with an embodiment of the disclosed technique.

FIG. 5 shows measurements relating to phase stability analysis of the output of the FGBS. Image (a) shows averaged optical density image of a set of 29 consecutive single images in the first half hour of an interferometric measurement session (one image per minute), and a one-dimensional cut (data and fit, see herein below). The visibility of the averaged fringe pattern reduces to 0.09±0.01, relative to the single shot value of 0.20±0.02. The average wavelength is similar, 23.1±0.35 μm in the single shots and 22.9±0.2 μm in the averaged image.

Eq. (3) is used for fitting the interference patterns as those shown in FIG. 5. For a pure superposition state, as in the model, the fringe visibility v should be one. The observed visibility is reduced due to various possible effects, such as unequal amplitudes of the two wavepackets or partial overlap between them, the finite temperature of the atomic cloud, effects of atomic collisions and limited imaging resolution. One should note that some of the many-body collisional effects, such as phase diffusion, would not lead to a reduction of the single-shot visibility but may cause the randomization of shot-to-shot phase. As the single-shot visibility did not imply that the interferometric process is coherent, one needs to examine the stability of the phase along many experimental realizations of the interference.

Phase and Momentum Stability

An analysis of a sequence of interference patterns is shown in image (a) and graphs (b-c) of FIG. 5, which reveal short-term phase fluctuations of δφ~1 radians and long-term drifts over a time scale of an hour. Illustration (b) shows phase distribution of the 29 images in $\pi/6$ radian bins, with a width of 1.04 radians (rms), in accordance with that expected by the stability analysis detailed herein below. A random distribution has a probability of $3 \cdot (\frac{2}{3})^{29} = 2.5 \times 10^{-5}$ of similarly occupying only $\frac{2}{3}$ of the phase spectrum. Graph (c) shows phase of fringes of averaged running sets ("windows") of 16 images over a total set of 55 consecutive images. This shows a long-term variation of the phase which is approximated by a sine fit (solid line) with an amplitude of 1.35 radian and a period of 65 minutes. The 29 images analyzed in image (a) were taken near the maximum of the long-term variation.

The coherence of the underlying interferometric process is clearly proven by this analysis.

To identify the sources of instability and suggest ways to reduce it, the propagation of the wavepackets with the help of the Gaussian model was analyzed. This analysis shows that the major source of phase instability in the experiment was the difference in magnetic field energy during the time between the two $\pi/2$ pulses of the FGBS, in which the two wavepackets occupy two different spin states. As the magnetic energy is linearly proportional to the pulse current, the phase fluctuation at a given reference point $z_0$ is $$\delta\phi = \frac{V_2(z_0) - V_1(z_0)T}{\hbar} \frac{\delta I}{I} + \frac{\delta T}{T} \equiv \qquad (4)$$

where the relative current fluctuations during the pulse $\delta I/I$ and the timing uncertainty $\delta T/T$ are both independently estimated for the electronics to have a root-mean-square (rms) value of $\sim 10^{-3}$. As the field applied by the chip wire at $z_0 = 100$ μm is about 27 G, corresponding to a Zeeman potential of $\sim 19$ MHz, for T=5 μs, phase fluctuations of $\delta\phi \sim 1$ radian were expected, similar to the observed short term phase fluctuations (width of the phase distribution shown in illustration (b) of FIG. 5. One should note that during the 100 μs time interval between the two $\pi/2$ pulses, a bias field of about 40 G (in the same direction as the wire field) is on. Changes in the distant coils responsible for this field are most likely the source of the observed long-term drift of the phase.

Although the FGBS intrinsic phase instability was found to be the main source of interferometric phase instability in the experiment, it is important to analyze the FGBS momentum instability, which may become the dominant factor in interferometers with larger space-time area.

In graph and images (d) of FIG. 5, a few images and fits of single interference patterns which reveal an instability in the CM momentum are shown. The sample of four fits of single images demonstrate the small variation of the fringe phase with respect to a fixed position, while the envelope of the pattern changes with no correlation to the fringes. The images from which the fits were taken are also shown, together with the averaged image of image (a). The source of this instability may be understood on the basis of Eq. (2), indicating that the momentum kick fluctuations of the FGBS are given by $$\frac{\delta p}{p} = \frac{\delta I}{I} + \frac{\delta T}{T} + 2\frac{\delta z_i}{z_i} \qquad (5)$$

where $z_i$ is the initial distance from the wire responsible for the momentum kick. As the trapping potential was generated by a wire at a distance of more than one millimeter (with its own relative current fluctuations of $10^{-3}$) rather than a chip wire (for technical reasons), one may estimate the uncertainty of this position to be $\delta z_i \sim 10^{-3} \cdot 1$ mm=1 μm. For $z_i = 100$ μm one has $\delta z_i/z_i \sim 10^{-2}$, making it the dominant source of momentum instability. Indeed, the observed width of the final CM position distribution is $\delta z_{CM}/z_{CM} \sim 0.02$. Simulations (e-f) show this decoupling between the wavepacket position and its phase based on the Gaussian wavepacket model of interference pattern stability for parameters similar to those used in the experiment (neglecting atom-atom interactions). The six upper plots demonstrate single interference events, where the interference patterns appear at different positions due to momentum fluctuations caused by an instability $\delta z_i = 1$ μm in the initial wavepacket position.

However, perhaps surprisingly, the observed momentum difference between the two wavepackets after the second momentum kick is much more stable and gives rise to a good overlap at each experimental shot, as observed in FIG. 5(*d*) [BGU: in which illustration exactly?]. Specifically, the 1/z potential in the experiment have been approximated by a quadratic form $$V_{m_F}(z, t) = V_{m_F}(z_0, t) - F_{m_F}(z_0, t)(z - z_0) - \frac{1}{2}F'_{m_F}(z_0, t)(z - z_0)^2 \qquad (6)$$

Where $F'_{m_F}(z_0,t)$ represents the inhomogeneity of the force $[F_{m_F} = -\partial V_{m_F}(z,t)/\partial z]$, acting as a harmonic force when $F'_{m_F} < 0$. The observed stability, namely the lack of relative momentum fluctuations, is due to the fact that the second momentum pulse reverses the effect of momentum fluctuations due to the first pulse. The second pulse applies a differential force $F_2(z_1) - F_2(z_2) = F'_2(z_0)(z_1 - z_2) \propto -(p_1 - p_2)$ which acts against initial momentum fluctuations. In the interferometric scheme used in the experiment, the second pulse introduces its own fluctuations of the momentum difference through current fluctuations $\delta I$ and $\delta T$, but as noted, this contribution is an order of magnitude smaller than that of the fluctuations introduced by the initial position fluctuations during the first pulse.

Finally, the Gaussian model shows that initial position fluctuations contribute very little to the fluctuations of the accumulated phase difference after a long TOF. In simulation (e) the chip wire current fluctuations are assumed to be $\delta I/I = 10^{-6}$. Phase instability is negligible and the averaged interference pattern (over 100 single patterns) is almost perfect (bottom plot). Simulation (f) shows the same as illustration (e) with $\delta I/I = 10^{-3}$. Phase fluctuations are about $\delta\phi \sim 1$ radian and the visibility of the average pattern is low.

An accurate understanding of the sources of instability in the experimental system, which was not dedicated to atom interferometry and used a simple wire configuration as well as electronics with regular technical noise, was gained. It has been shown that the presented Gaussian model correctly predicts the position and phase fluctuations of the observed fringes, as well as the decoupling between the position and phase.

A straight-forward way to improve phase stability [Eq. (4)] is to improve the stability of current amplitude and timing. In addition, one can use a configuration with decreased ratio between the magnetic field at the trapping position $V_{m_F}(z_0,t)$ and its gradient [see Eq. (2)], such that the momentum kick may be increased while keeping the same phase fluctuations or the phase fluctuations may be reduced while keeping the same momentum kick. One way to achieve this is to set the initial trapping position z closer to a narrower chip wire. An alternative way is to use three parallel wires with alternating currents, such that a quadrupole field is formed near the initial position of the atoms. Such a field provides a high gradient and a small absolute value of the magnetic field. Momentum kick variations may also be reduced by using chip based initial trapping for a better control of the initial position.

In order to estimate the bounds on phase and momentum stability, one may consider the available technology. Assuming, for example, a 10 μs pulse, then, for a 2 A current (containing ~$10^{14}$ electrons), the shot noise leads to $\delta(IT)/IT$~$10^{-7}$. Power sources with sub shot noise are being developed (e.g. http://www.techbriefs.com/component/content/article/11341) and may enable an even better stability. Stable current pulses may be driven by ultra stable capacitors, which reach stability of $\delta C/C=10^{-7}$ at mK temperature stabilities. For picosecond switching electronics, one similarly finds $\delta T/T$~$10^{-7}$. Taking these numbers as the limits, and assuming that the momentum pulse could be performed in a medium magnetic field of 1 G (splitting of 0.7 MHz), the limit on phase uncertainty of the FGBS becomes $\delta\phi$~$6 \cdot 10^{-6}$ radian, while momentum stability is bound by $\delta p/p$~$10^{31\ 7}$. Phase and momentum stability may improve even more for longer and larger current pulses giving rise to higher momentum transfer, as the relative timing instability and shot noise reduces. A more careful estimation would require taking into account the specific structure of the FGBS and the whole interferometer, as well as environmental factors such as thermal expansion of chip elements.

Field gradient momentum splitting systems and methods according to the disclosed technique may use trapped particles. An FGBS system and method thereof using trapped atoms have been implemented as well.

According to another embodiment of the disclosed technique, a system and a method for field gradient momentum splitting of a cloud of trapped atoms are described. An experiment repeating the operation scheme of a method according to FIG. 1B and of an FGBS according to FIG. 2 on an atom cloud trapped in an Ioffe-Pritchard (IP) magnetic trap, where the main difference is that the magnetic gradient is provided by the trapping potential itself, which is fixed in time. Although the gradient exists also during the π/2 pulses, the intensity of the short pulse makes it sufficiently effective in creating the superposition (a π pulse of the same intensity transfers around 85% of the atoms, compared with around 95% in free fall).

Figure 6:
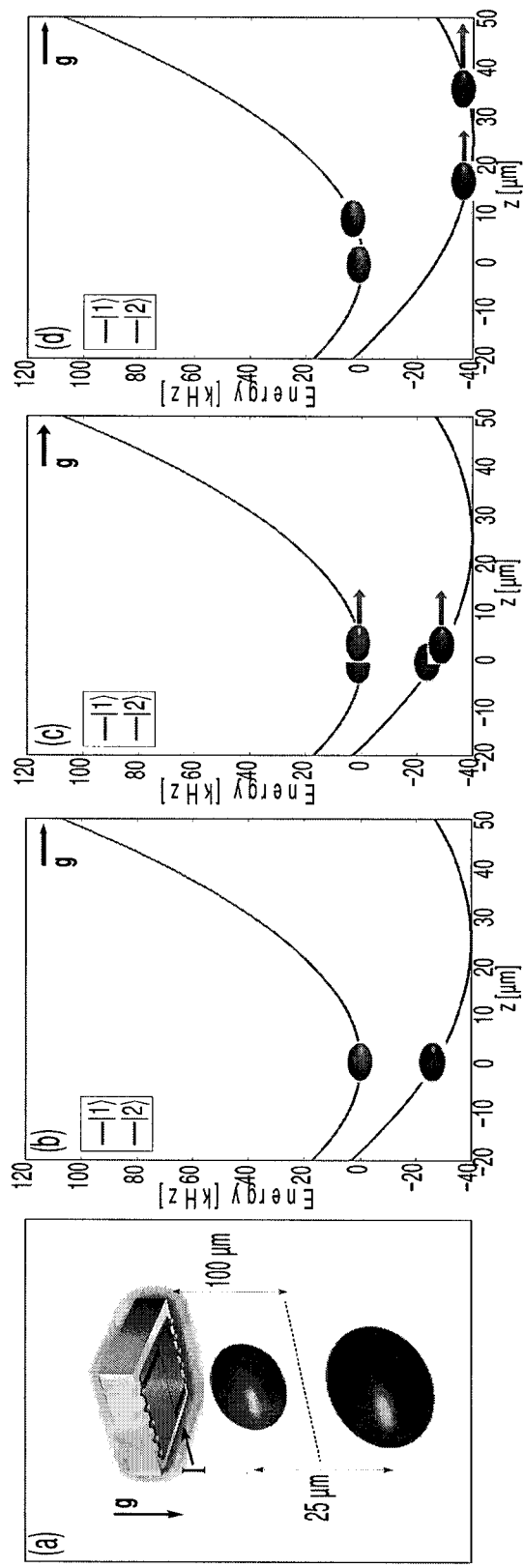
FIG. 6, is a diagram which illustrates an operation scheme of a system and a method on trapped atoms in accordance with the disclosed technique.
Figure 7:
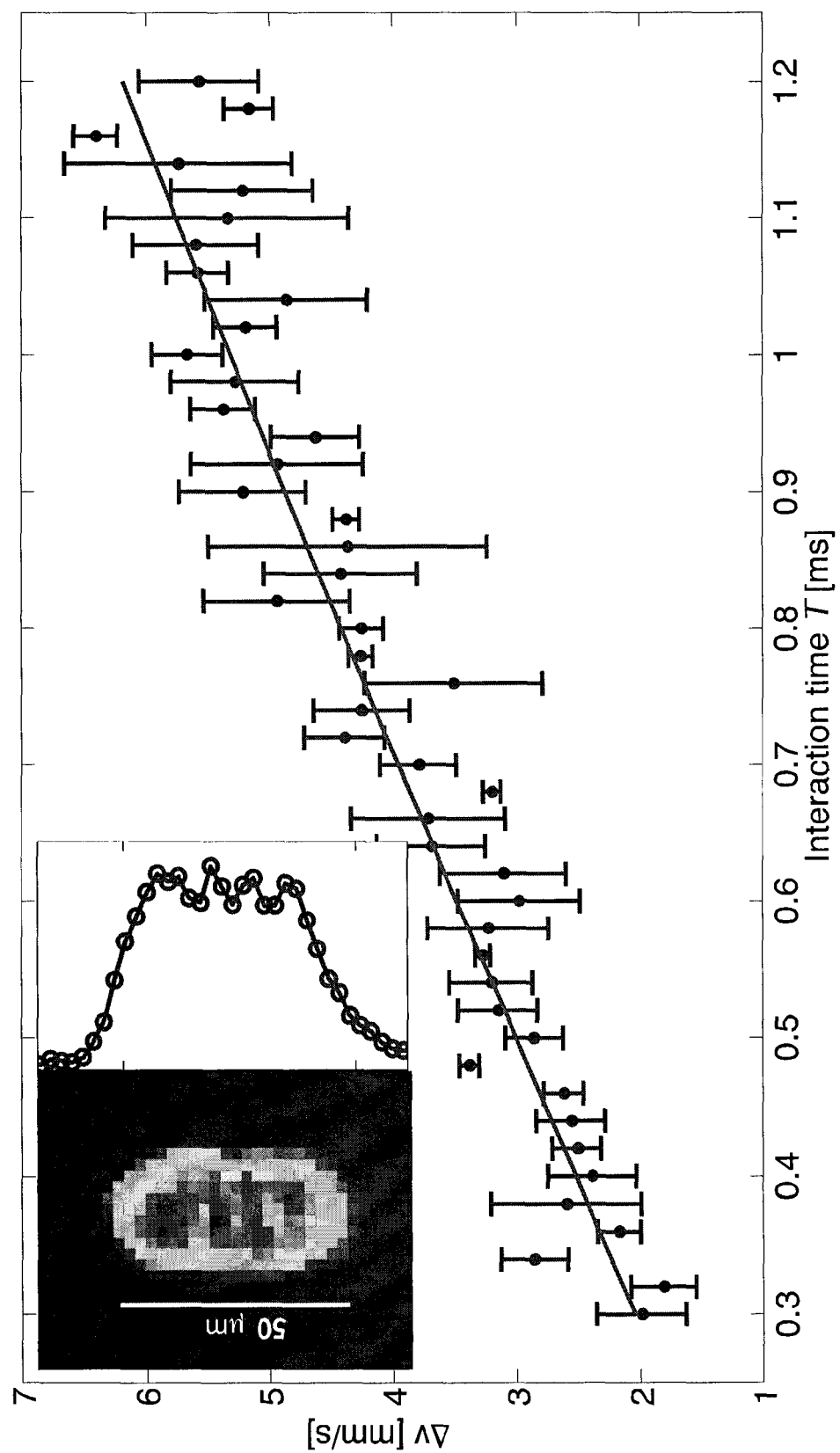
FIG. 7 is the differential momentum between two observed clouds as a function of the interaction time T as measured in an experiment in accordance with FIG. 6.

Reference is now made to FIGS. 6 and 7. FIG. 6 is a diagram that illustrates an operation scheme of a system and a method on trapped atoms in accordance with the disclosed technique. FIG. 7 is the differential momentum between two observed clouds as a function of the interaction time T as measured in an experiment in accordance with FIG. 6. In illustration (a), two potentials for the states |1⟩ and |2⟩ are presented by their equipotential surfaces, below an atom chip showing the vertical separation between the two traps, and the difference in size due to the different confinement.

In illustrations (b-d) a 1D energy (the energy difference was minimized for visibility) is utilized versus position (ż) plot to describe the evolution of the system or process during and after the field gradient beam splitting sequence. The four parts of the wave-function and their momentum (the length of the arrows indicates the value of the momentum) are also shown. Illustration (b) shows the splitting just after the first π/2 pulse, where the position of both clouds is at the trap minimum of the |2⟩ state. Due to gravity, the centers of the combined magnetic and gravitational trapping potentials for the two levels are shifted by $\Delta z=g/\omega_2^2$ ($\omega_i$ is the trapping frequency of state |i⟩). It follows that when an atomic wavepacket initially at the level |2⟩ is transferred by the first π/2 pulse into level |1⟩, it experiences acceleration $dv_z/dt=-\omega_1^2 \Delta z=-g/2$ (as $\omega_1=\sqrt{2}\omega_2$).

Illustration (c) shows the clouds after the second π/2 pulse. For interaction times T π/$\omega_1$ these atoms move only slightly along the potential gradient (the distance is exaggerated in the image for clarity) such that sin(ωT)/ω≈T, and as in the free fall scheme, the momentum splitting grows almost linearly with T, as expected from Eq. (4).

This almost linear dependence is shown in FIG. 7 which shows the differential velocity of the two wavepackets as a function of the interaction time T. Δv, and its error, were taken from a linear fit of six measurements for each T, at two different Rabi frequencies and three TOFs. The solid line shown in FIG. 7 is a theoretical curve $$v(T) = \frac{g}{2}\sin(\omega_1 T)/\omega_1 + v_r,$$

where $v_r$=0.58 mm/s is an additional velocity due to atom-atom repulsive interaction (no fitting parameters). The first term follows from an integration of the momentum kick [Eq. (4)], while the collisional constant $v_r$ is due to atom-atom collisional repulsion and is obtained from a full numerical GP simulation.

In order to recombine the two wavepackets and observe the interference pattern, the atoms have been allowed to oscillate in the trap for a period of about 2 ms, which is approximately a quarter of the trap harmonic period, so that one part of the |2⟩ state didn't move, the other part of the |2⟩ was slowed by the trapping potential almost to a halt, while the two parts of |1⟩ were accelerated, as shown in illustration (d) of FIG. 6. The trap is then turned off, and the two wavepackets, positioned at z≈0 and at z≈Δp/m$\omega_2$ 2d, expand, overlap, and form multiple interference fringes, as seen in FIG. 7.

In the experiment, shot-to-shot fluctuations of the magnetic field at the trap bottom were independently measured to be on the order of a few kHz. For interaction times as long as 0.7 ms this sums up to phase fluctuations of at least a few radians, which do not allow the observation of repeatable fringe patterns, as those observed in the free fall experiment. Improvement may be achieved either by improving trap bottom stability or by using an additional magnetic field gradient pulse in order to achieve accelerations which are much larger than those allowed by gravity, and thus allow for larger differential velocities with a shorter interaction time.

The above experiment may be performed by adding an additional field gradient, while the gradient from the trapping potential itself is not utilized. This can reduce the time between the two π/2 pulses and increase the momentum difference between the two wavepackets.

Systems and methods in accordance with the disclosed technique have been realized for splitting matter waves of particles into momentum states by using local magnetic field gradients and have observed repeatable spatial interference fringes, which indicate the coherence of the splitting process. A detailed analysis of the causes for phase and momentum instabilities was presented. The analysis exhibits a good fit to the experimental observations. This enables to extrapolate and predict the ultimate accuracy of such a system or method, in accordance with the disclosed technique, which was found to be high.

Other possible alternatives for the operation of a field gradient beam splitting systems (FGBS) or methods in accordance with the disclosed technique include different level schemes. One example is the possible use of magnetically insensitive atomic levels such as $|2,0\rangle$. A superposition of two momentum states of $|2,0\rangle$ can be easily achieved by a Rabi rotation with a RF pulse tuned to the transition $|2,1\rangle \rightarrow |2,0\rangle$. Another example is a system or method utilizing a microwave transition between two hyperfine states with different magnetic moment, such as the states $|2,1\rangle$ and $|1,1\rangle$, enabling symmetric splitting with opposite momentum. Through second order Zeeman, a system or method in accordance with the disclosed technique may also split directly the magnetic noise immune "clock" states $|1,0\rangle$ and $|2,0\rangle$ (see further details herein below under "Methods").

Figure 8:
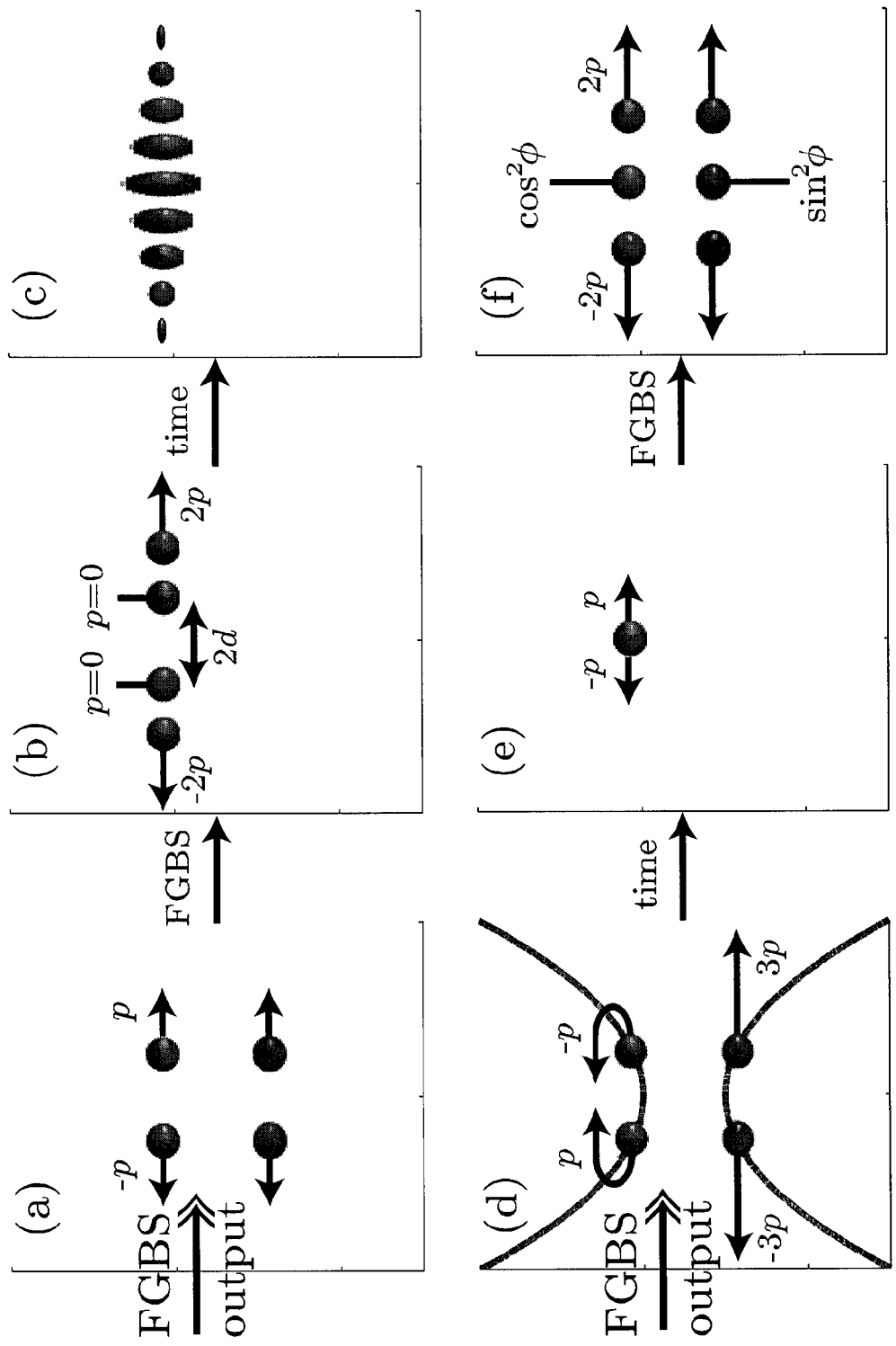
FIG. 8 shows two diagrams presenting the operation schemes of spatial signal interferometery and of internal state signal interferometery, constructed and operative with the disclosed technique.

FIG. 8 shows two diagrams presenting the operation of a spatial signal interferometer and an internal state signal interferometer and methods thereof, constructed and operative with embodiments of the disclosed technique. The vertical axis of the diagrams represents energy and the horizontal axis represents a spatial dimension. Each of the interferometers utilizes at least one FGBS system, constructed and operative in accordance with the disclosed technique.

The spatial signal interferometer and the method thereof create spatial fringes and replace the second momentum kick used in the experiment with a second field gradient momentum splitting when the spatial separation between the two wavepackets is 2d. Unlike the technique used in the experiment, which is based on a long inhomogeneous gradient pulse, the proposed technique uses a short pulse with the price of reducing the signal intensity by a factor of 2. Reference is now made to the diagram 8, illustrations (a-c), showing the operation of the spatial signal interferometer and a method thereof. In stage (a), a first FGBS system outputs cloud of particles having two momentum components which are split spatially. In stage (b), the output is received in a second FGBS system (or alternatively received by the first FGBS system, when a single FGBS system is used), which creates four clouds (considering only the $\uparrow 2\rangle$ state). Two clouds are at rest and two clouds are at ±2p. In stage (c), after some evolution time, the two clouds, which are at rest, expand, overlap and create a spatial interference pattern.

Reference is now made to illustrations (d-f) of FIG. 8 showing the operation of the internal state signal interferometer and a method thereof. In stage (d), a first FGBS system outputs a cloud of particles. After splitting and propagation, a returning force is applied for state $|2\rangle$, which reverses the motion of state $|2\rangle$ and repels state $|1\rangle$. In stage (e), after an evolution time the two momentum components overlap in space. In stage (f), a second FGBS system (or alternatively the first FGBS system, when a single FGBS system is used) is applied, forming a superposition of three momentum components. The middle component interferes internally, such that the internal state population depends on the relative phase between the two parts of the wavefunction just before the second FGBS system. The internal state signal interferometer includes at least one FGBS system in accordance with the disclosed technique (see FIG. 2) and further includes a returning force generator. Such a returning force may be any kind of potential and such as harmonic potential. Such potential may be for example magnetic, electronic or optical. A returning force generator may include a current carrying wire (or a set of such wires) or static magnets in order to generate a magnetic force, electrodes in order to generate an electric force or a laser source in order to generate an optical force. The returning force generator may be integrated with the pulse generator or the field gradient generator of the FGBS system. Further details with respect to the operation of such interferometers are provided herein below under "Methods".

Methods

Gaussian Wavepacket Model for Interferometry

The model assumes that the particle state at each stage of the interferometric process or of the operation of an interferometric system in accordance with the disclosed technique is a superposition of wavepackets as in Eq. (1) herein above. The spatial representation can generally be written as $$\langle z|\psi\rangle = \Sigma \psi_j(z,t)|w_j\rangle \qquad (7)$$

where $|w_j\rangle$ represent internal state trajectories, such that at time t two states $|w_j\rangle$ and $|w_k\rangle$ may either represent two different internal states or the same internal state with different internal state histories. In the case of the experiments detailed herein above for example, the state $|w_1\rangle$ represents atoms that were initially at the state $|m_F=2\rangle$, then transformed into $|m_F=1\rangle$ during the first π/2 pulse and then back to $|m_F=2\rangle$ during the second π/2 pulse, and $|w_2\rangle$ will represent a trajectory where the atoms stayed at $|m_F=2\rangle$ throughout this process. In what follows the ket symbols $|w_j\rangle$ are omitted whenever they represent the same internal state at time t. In Eq. (7), $\psi_j(z, t)$ represent spatial wave-functions which are considered as Gaussian wavepackets $$\psi_j(z,t) = \exp{-a_j(t)z^2 + b_j(t)z + c_j(t)} \qquad (8)$$

where $a_j$, $b_j$ and $c_j$ are complex. This is equivalent to the form $$\psi_j(z,t) = C_j \exp{-a_j(t)(z-Z_j(t))^2 + \frac{i}{\hbar}P_j(t)(z-Z_j(t)) + i\phi_j(t)} \qquad (9)$$

where $Z_j(t)$ is the central position and $P_j(t)$ is the central momentum of the j'th wavepacket, while $\phi_j$ is a real phase of the wavepacket at the centre.

Assuming that the potential is smooth enough on the scale of the wavepacket, such that it can be approximated by a quadratic form as in Eq. (6) with the force $F_j = -\partial_z V_j$ and the potential curvature $F'_j = -\partial_z^2 V_j$ (with $m_F \rightarrow j$). With this approximation and neglecting atom-atom interactions, the Gaussian ansatz is an exact solution for the propagation problem. By substituting the Gaussian form (8) in the Schrodinger equation $i\hbar\dot\psi_j = -\hbar^2\partial_z^2\psi_j/2m + V_j\psi_j$ and equating terms proportional to $z^2$, z and 1 one may obtain the equations for the coefficients $$\dot a_j = -i\frac{2\hbar}{m}a_j^2 - i\frac{F'_j}{2\hbar} \qquad (10)$$

$$\dot b_j = i\frac{2\hbar}{m}a_j b_j + i\frac{F_j}{\hbar} \qquad (11)$$

$$\dot c_j = i\frac{\hbar}{2m}b_j^2 - 2a_j \qquad (12)$$

By comparing the forms (8) and (9) one finds that $b_j=2a_jZ_j+iP_j/\hbar$ and $c_j=\log(C_j)-a_jZ_j^2-iP_jZ_j/\hbar+i\phi_j$, where the equations for the center coordinates are given by the Newtonian equations of motion $$\dot{Z}_j=P_j/m, \dot{P}_j=F_j+F'_jZ_j \quad (13)$$

where the solution for the phase in the wavepacket CM frame is $$\phi_j(t) = \phi_j(0) + \frac{1}{\hbar}\int_0^t dt'[P_j(t')^2/2m - V_j(Z_j(t'))] \quad (14)$$

An analytical solution for $a_j$ is possible for constant coefficients $F_j$ and $F'_j$ $$a_j(t) = -i\frac{m}{2\hbar}\frac{\dot{A}_j}{A_j} \quad (15)$$

$1 + 2i\hbar a_j(0)t/mF'_j = 0$ $$A_j(t) = \cos\omega t + ia_j(0)a_{ho}^2\sin\omega t F'_j < 0 \quad (16)$$
$\cosh\omega t + ia_j(0)a_{ho}^2\sinh\omega t F'_j > 0$ Taking a superposition of two wavepackets of the form (9) with equal amplitudes $C_j$ and widths ($a_1=a_2=a$). The result is $$\psi(z) = \frac{1}{\sqrt{2}}[\psi_1(z) + \psi_2(z)] = \quad (17)$$

$$\frac{1}{\sqrt{2}}\psi_{CM}(z)e^{-a\Delta z^2/4 - i\Delta p\Delta z/4} \times e^{(\xi_1-\xi_2)z+(\theta_1-\theta_2)/2} + e^{(\xi_2-\xi_1)z+(\theta_2-\theta_1)/2}$$

Where $Z_{CM}=(Z_1+Z_2)/2$ is the position of the centre-of-mass of the two wavepackets and $P_{CM}=(P_1+P_2)/2$ is the center-of-mass momentum, while $\Delta z=Z_1-Z_2$ and $\Delta p=P_1-P_2$ are the corresponding position and momentum differences. $\psi_{CM}(z)$ is the wave-function of the form of Eq. (9) with $Z_{CM}, P_{CM}$ and $\phi_{CM} (\phi_1+\phi_2)/2$ replacing the corresponding single wavepacket coordinates and phase. The exponential arguments are $\xi_j(t)=aZ_j+iP_j/2$ $\theta_j(t)=i\phi_j-iP_jZ_j-aZ_j^2 \quad (18)$ In free-space propagation $a(t)=a(0)(1+2ia(0)\hbar t/m)^{-1}$. By substituting $Z_j(t)=Z_j(0)+P_jt/m$ in the expression for $\xi_j$ one obtains $$\xi_j(t) = a(t)Z_j(0) + i\frac{P_j}{2\hbar}[1 - 2ia(t)\hbar t/m] \quad (19)$$

After a time t such that $t \, m/2\hbar|a(0)|$, one has $a(t)\sim-im/2\hbar t$ such that the term containing the momentum vanishes.

The atomic density per unit length is given by $N|\psi(z)|^2$, where N is the total atom number. In the long time limit the coefficient a becomes imaginary, such that $\xi_j$ and $\theta_j$ in Eq. (17) become imaginary as well. The last line of Eq. (17) becomes $\cos(\Delta\xi z+\Delta\theta/2)=\cos(mdz/\hbar t+\phi/2)$, where $2d=Z_2-Z_1$ and $\phi=\theta_2-\theta_1$. In order to obtain Eq. (3) of the main text one may take the square absolute value of Eq. (17), and use $\text{Re}\{a(t)\} = 1/4\sigma_z(t)^2$ and $\cos^2(x/2) = \frac{1}{2}[1+\cos(x)]$.

The visibility v is ideally equal to 1 and was included as a parameter in Eq. (3) herein above in order to account for the real interference patterns whose visibility is lower than the ideal one.

Splitting Magnetically Insensitive States

Interferometric systems and methods in accordance with the disclosed technique may involve at least two first-order magnetically insensitive states, which is analogous to those used in present day precision interferometers. A $\pi/2$ pulse may be used to create an equally populated superposition of the two states and then they may be split into two momentum components using a magnetic gradient at a high magnetic field. The nonlinear Zeeman shift of the transition energy between the states is $\Delta E \approx \alpha B^2$. According to the experiment designed to realize an FGBS system in accordance with the present technique (see FIGS. 3A-4), the two first-order magnetically insensitive states are $|1,0\rangle$ and $|2,0\rangle$ of the two hyperfine states, while $\alpha=2\pi\hbar\times575$ Hz/G$^2$. For example, at a distance of 10 μm from a wire carrying 2 A of current the atoms are exposed to a magnetic field of B=400 G and a magnetic gradient of $\partial_z B=40$ kG/mm. It then follows that $F=\partial_z\Delta E(z)=2\pi\hbar\times575\times 2B\partial_z B=1.22\times 10^{-20}$N and consequently atoms receive a differential velocity of 84.7 mm/s for a 1 μs pulse, equivalent to about 18 $\hbar k$. As the two states are relatively magnetically insensitive, the second $\pi/2$ pulse of the FGBS system would not be needed and the two output beams of this beam splitter could be used for interferometry in a completely analogous way to existing interferometers based on light beam splitters. Recombining the two wavepackets similarly requires only a gradient and one $\pi/2$ pulse, and the internal state population can now be measured.

Interferometry Schemes

In order to construct an interferometer (or utilize a method of interferometry) based on spatial or internal state interference, one needs to recombine two momentum outputs of a field gradient beam-splitter (FGBS) system or a method thereof in accordance with the disclosed technique.

In the center-of-mass (CM) frame, a particle that was accelerated by the force $F_2(F_1)$ is at time t after the FGBS system in the state $|p,d\rangle$ ($|-p,-d\rangle$) where $p=(p_2-p_1)/2$ and $d=pt/m$ represent the external degrees of freedom of the center of the wavepackets, m being the mass. At this point their relative motion can be stopped and after sufficient free expansion time (or time-of-flight) $t_{TOF}$ they overlap and create a spatial fringe pattern with periodicity $\lambda=ht_{TOF}/2md$.

The simplest way to stop the relative wavepacket motion is to apply a gradient (e.g. harmonic potential) which will accelerate each part of the wave-function in an opposite direction. This was followed in the experiment, as described above.

Another way to stop the relative motion of the two wavepackets is to apply a second FGBS system (or alternatively, utilizing the same FGBS system), as shown in FIG. 8 (spatial signal interferometer). Considering only the state $|2\rangle$, the spatial wave-function in the CM momentum and position coordinates is $$\frac{1}{\sqrt{2}}(-|-p,-d\rangle + e^{i\phi}|p,d\rangle),$$

where φ is the relative phase accumulated between the two paths during the propagation. After the second FGBS system, which applies a momentum difference $p_0$, the new wave-function in the CM frame is $$\frac{1}{2}(-|I_-\rangle|-p-p',-d\rangle-|I_+\rangle|p+p',d\rangle])+e^{i\phi}[|I_-\rangle|p-p',d\rangle+|I_+\rangle| \quad (20)$$
$$p+p',d\rangle])$$

such that if $p'=\pm p$ two wavepackets are left with the same momentum at $\pm d$, giving rise to spatial interference after expansion.

If one wishes to use the internal state population as a signal, one may overlap the two parts of the wave-function spatially and then apply another FGBS, as shown in FIG. 8 (internal state signal interferometer). Once the wavepackets overlap, the second FGBS system is operated, giving rise to a wave-function of the same form as in Eq. (20) with d→0. If the magnitude of the momentum kick $p_0$ of the second FGBS system is equal to that of the first FGBS system, one is left with two wavepackets with a zero CM momentum in an internal state which depends on the propagation phase φ. For $p'=\pm p$ in Eq. (20), the internal state with zero CM momentum is $$\frac{1}{\sqrt{2}}(-|I_\pm\rangle+e^{i\phi}|I_\mp\rangle)=e^{i\phi/2}[\mp\cos(\phi/2)|2\rangle+i\sin(\phi/2)|1\rangle] \quad (21)$$

What is claimed is:

1. A method for coherent momentum splitting of a matter wave of at least one particle, the method comprising the steps of:
    applying on said matter wave a first π/2 Rabi rotation pulse, wherein said matter wave is split into a superposition of internal states;
    applying on said matter wave a magnetic field gradient during a predefined time interval between said application of said first π/2 Rabi rotation pulse and an application of a second π/2 Rabi rotation pulse, wherein said field gradient constitutes a state selective force; and
    applying on said matter wave the second π/2 Rabi rotation pulse, wherein said matter wave is transferred into a superposition of internal and momentum states.

2. The method of claim 1, wherein said matter wave is of cold atoms.

3. The method of claim 1, wherein said at least one particle is in a Bose-Einstein condensate state.

4. The method of claim 1, wherein said matter wave is trapped by a trapping potential.

5. The method of claim 4, further comprising the step of releasing said matter wave to freely propagate.

6. The method of claim 1, further comprising the step of applying another field gradient, wherein said another field gradient applies an internal state selective force.

7. The method of claim 1, wherein said π/2 Rabi rotation pulse is any of: a radio frequency pulse tuned to a transition frequency between internal states of said matter wave, a microwave pulse tuned to a transition frequency between internal states of said matter wave.

8. The method of claim 1, wherein said field gradient is applied in the direction of the motion of said matter wave or in the direction perpendicular to the motion of said matter wave.

9. A method for quantum entanglement of matter waves comprising utilizing the method for coherent momentum splitting of a matter wave according to claim 1.

10. A method for matter wave squeezing comprising utilizing the method for coherent momentum splitting of a matter wave according to claim 1.

11. A method for stopping the dephasing of matter waves comprising utilizing the method for coherent momentum splitting of a matter wave according to claim 1.

12. A method for matter wave interferometry, said method comprising the steps of:
    performing a first coherent momentum splitting of said matter wave in accordance with the method of claim 1, wherein said matter wave is transferred into a first superposition of internal and momentum states;
    responsive to performing the first coherent momentum splitting, allowing the momentum states to spatially split after an evolution time period; and
    performing a second coherent momentum splitting of at least one internal state of said first superposition in accordance with the method of claim 1, wherein said at least one internal state is transferred into a second superposition of internal and momentum states, whereby a portion of momentum states of said second superposition, having the same internal state, are at rest in the center of mass frame of said same internal state, and whereby said portion of momentum states expand and overlap to create a spatial interference.

13. A method for matter wave interferometry, said method comprising the steps of:
    performing a first coherent momentum splitting in accordance with the method of claim 1, wherein said matter wave is transferred into a first superposition of internal and momentum states;
    responsive to performing the first coherent momentum splitting, allowing the momentum states to spatially split after a first evolution time period;
    applying a returning force on said split matter wave for reversing the momentum of at least one of said internal states in a center of mass frame of said at least one internal state;
    allowing said reversed internal states to spatially overlap after a second evolution time period; and
    performing a second coherent momentum splitting in accordance with the method of claim 1, wherein said reversed internal state is split into a second superposition of internal and momentum states, whereby a portion of the states of said second superposition is at rest in the center of mass frame of said reversed internal state, and whereby said portion of states interferes internally.

14. A method for coherent momentum splitting of first order magnetically insensitive states of a matter wave of at least one particle, the method comprising the steps of:
    applying on said matter wave a first π/2 Rabi rotation pulse, wherein said matter wave is split into a superposition of magnetically insensitive internal states; and
    applying on said matter wave a field gradient during a predefined time interval, wherein said field gradient constitutes a state selective force, wherein said matter waves are transferred into a superposition of internal and momentum states, and wherein the momentum states are spatially split after the predetermined time interval.

15. A system for coherent momentum splitting of a matter wave of at least one particle, the system comprising
- a pulse generator configured to generate a first and a second π/2 Rabi rotation pulse, whereby said first and second pulse transferred said matter wave into a superposition of internal states; and
- a magnetic field gradient generator configured to apply a state selective force on said internal states during a predefined time interval, whereby said matter wave is transferred into a superposition of internal and momentum states, wherein the momentum states are spatially split after a predetermined time period.

16. The system of claim 15, further comprising an atom chip.

17. The system of claim 15, wherein said pulse generator is a radio frequency pulse generator, a microwaves pulse generator, or both.

18. An interferometer comprising at least one system of claim 15, said system configured to spatially split said matter wave into a first superposition of internal and momentum states and split at least one internal state of said first superposition into a second superposition of internal and momentum states, whereby a portion of the momentum states of said second superposition, having the same internal state, are at rest in the center of mass frame of said same internal state, and whereby said portion of momentum states expand and overlap to create a spatial interference.

19. An interferometer comprising at least one system of claim 15, configured to spatially split said matter wave into a first superposition of internal and momentum states and split a reversed internal state of said first superposition, when said reversed internal state overlap in space, into a second superposition of internal and momentum states; and
- a returning force generator, configured to generate said reversed internal state by reversing the momentum of at least one of the internal states of said first superposition in a center of mass frame of said at least one internal state, whereby a portion of the states of said second superposition is at rest in the center of mass frame of said reversed internal state, and whereby said portion of states interferes internally.

20. A system for coherent momentum splitting of first-order magnetically insensitive states of a matter wave of at least one particle, the system comprising:
- a pulse generator configured to generate a π/2 Rabi rotation pulse, whereby said pulse is configured to split said matter wave into a superposition of magnetically insensitive internal states; and
- a magnetic field gradient generator configured to: a) apply a state selective force on said magnetically insensitive internal states during a predefined time interval, b) transfer said matter wave into a superposition of momentum states, and c) spatially split the momentum states after a predetermined time interval.

* * * * *